Dec. 29, 1964                H. KELCH ETAL                3,163,357
                       CLOCKWORK DRIVE FOR TAXIMETERS
Filed June 11, 1962                                       4 Sheets-Sheet 1

INVENTORS
Heinz Kelch
Eduard Schuh
BY
Michael S. Striker

Dec. 29, 1964   H. KELCH ETAL   3,163,357
CLOCKWORK DRIVE FOR TAXIMETERS
Filed June 11, 1962   4 Sheets-Sheet 2

INVENTORS
Heinz Kelch
Edward Schulz
BY
Michael S. Striker
Atty

Dec. 29, 1964  H. KELCH ETAL  3,163,357
CLOCKWORK DRIVE FOR TAXIMETERS

Filed June 11, 1962  4 Sheets-Sheet 4

INVENTOR.
Heinz Kelch
Edward Schuh
BY
Michael S. Striker
Atty

United States Patent Office 3,163,357
Patented Dec. 29, 1964

3,163,357
CLOCKWORK DRIVE FOR TAXIMETERS
Heinz Kelch and Eduard Schuh, Villingen, Black Forest, Germany, assignors to Kienzle Apparate G.m.b.H., Villingen, Black Forest, Germany
Filed June 11, 1962, Ser. No. 202,647
Claims priority, application Germany, June 9, 1961, K 43,950
15 Claims. (Cl. 235—30)

The present invention relates to taximeters.

More particularly, the present invention relates to that type of taximeter which is driven by an electric motor in response to operation of a push-button by the operator of the taxi.

Taximeters of this type include a clockwork which is used to drive various parts of the taximeter such as the shaft thereof which drives a totalizing mechanism which indicates the fare in accordance with the distance traveled as well as the time which elapses during use of the taxi.

The rate with which the charges are made for the time that the taxi is used can vary quite widely. For example, during normal travel the time during which the taxi is used will be calculated according to one rate. Should the occupant of the taxi request the driver to wait while the occupant leaves the taxi expecting to return shortly, then the rate of charge is different from when the taxi is traveling. Again, the time during which the taxi is in traffic but not moving, as when stopped for a traffic light, will be charged at still another rate. In actual practice the ratio between the smallest and largest rates of charges for time during which the taxi is used can be 1:24. The result is that the clockwork will drive the transmission to the totalizing unit at one time at a rate of speed which is 24 times the rate of speed with which the totalizing mechanism is driven at another time, and thus for one particular clockwork it is as a practical matter impossible to maintain the required accuracy of operation throughout such a spread of rate changes because of the different turning moments and transmission ratios which are encountered and which prevent accurate operation throughout the different rates of drive.

It is accordingly a primary object of the present invention to provide for a taximeter of the above type a structure which will automatically maintain a spring motor which drives a clockwork of the taximeter at a tension which is substantially constant in that it will vary only between very narrow limits and will have a tension adapted to the particular taximeter, even though the charging rates vary widely as discussed above.

Another object of the present invention is to provide for a taximeter a single electric motor with a transmission through which this single electric motor is capable on the one hand of operating a control shaft which controls the functions of the taximeter and which on the other hand is used for periodically tensioning the spring motor which drives the clockwork.

Still another object of the present invention is to provide a structure of the above type which is fully automatic particularly with respect to its function of maintaining the tensioning of the clockwork-driving spring motor substantially constant at all times.

The objects of the present invention also include the provision of a structure capable of accomplishing all of the above objects and at the same time composed of relatively simple and inexpensive parts which are easy to assemble and which are very reliable in operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic illustration of the drive from the single electric motor on the one hand to the control shaft controlling the functioning of the taximeter and on the other hand to the clockwork;

FIGS. 2 and 3 respectively illustrate different operating positions of the parts which control the periodic tensioning of the spring motor which drives the clockwork;

FIG. 4 is a schematic illustration of the electrical circuit of the electric motor;

Figure 6:
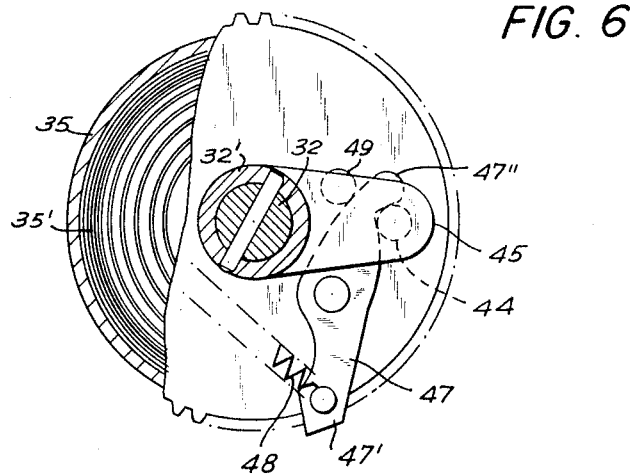
Figure 7:
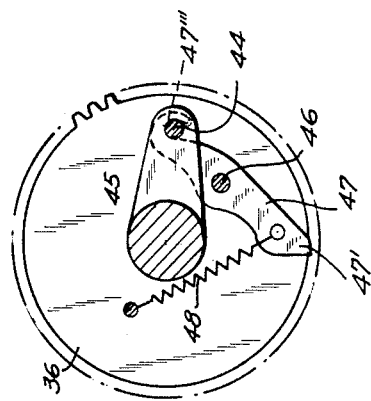
Figure 8:
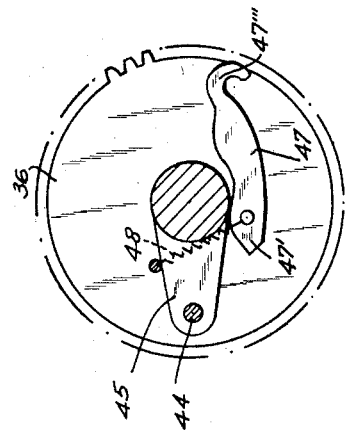

FIG. 6 is a partly broken away and partly sectional illustration of the spring motor which drives the clockwork, FIG. 6 showing in addition levers which participate in the actuation of the structure for periodically tensioning the spring motor; and FIGS. 7 and 8 respectively illustrate two different positions of a structure which will accomplish the same result as the structure of FIG. 6 but which has a slightly different construction.

Figure 1:
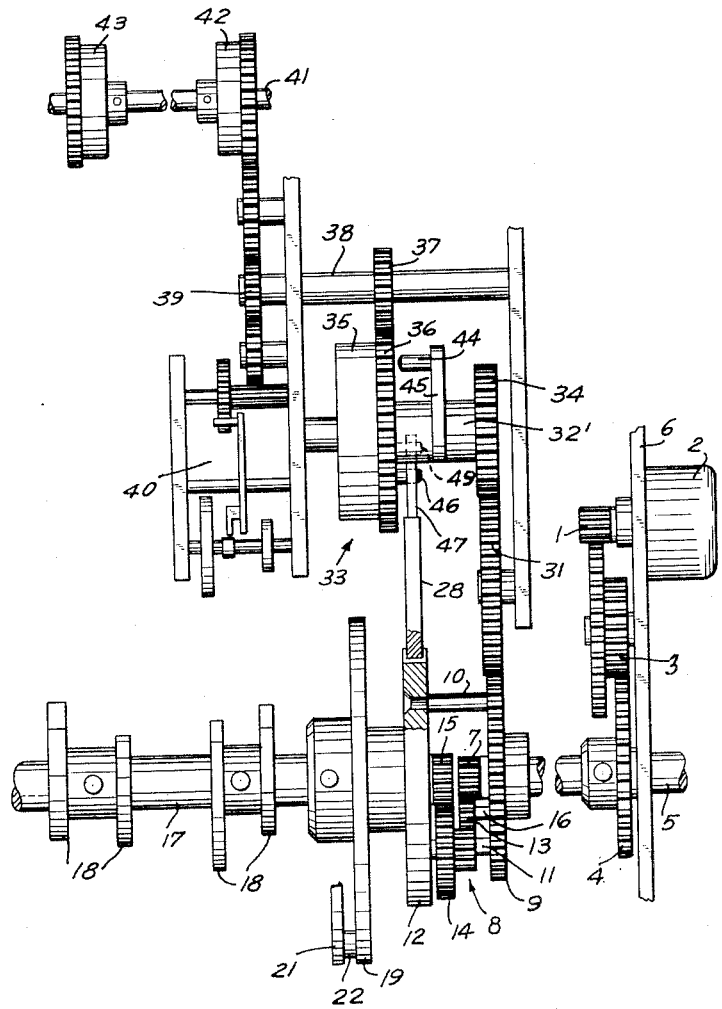

Referring now to FIG. 1, there is shown therein the motor shaft 1 of the electric motor 2, this shaft 1 driving through the step-down transmission 3 a gear 4 which is coaxially fixed to a rotary shaft 5. The motor 2 is carried by a stationary plate 6, and this plate 6 also provides a bearing to support the shaft 5 for rotation about its axis. This shaft 5 terminates at its left end, as viewed in FIG. 1, in a sun gear 7 of a differential drive 8. The differential drive 8 further includes a rotary gear 9 which is coaxially carried by the shaft 5 and which is freely turnable with respect to the shaft 5. An elongated pin 10 extends parallel to the shaft 5 and is fixed at one end to the gear 9 and at its opposite end to a rotary disc 12 which forms part of a blocking means as described below. In addition, the gear 9 is fixed to the blocking disc 12 through an elongated pin 11 connected at one end to the gear 9 and at its opposite end to the disc 12, this elongated pin 11 supporting for rotation planetary gearing 14 of the differential drive 8. In addition, the gear 9 fixedly carries a pin 16 which also extends parallel to the shaft 5, and this pin 16 supports for rotation an intermediate gear 13 which meshes on the one hand with the gearing 14 and on the other hand with the sun gear 7, so that in this way the gear 7 is in driving engagement through the gear 13 with the planetary gearing 14. The planetary gearing 14 in addition to meshing with the gear 13 meshes with a second sun gear 15 of the differential drive 8, so that through the planetary gearing the sun gears 7 and 15 are connected to each other. The sun gear 15 is fixedly carried by and located at one end of an elongated control shaft 17 which turns in order to automatically control the functioning of the taximeter. For this purpose the control shaft 17 carries cams 18 which are fixed to the shaft 17 to rotate therewith and which in a manner known in the art are controlled by turning of the shaft 17 so as to control the various functions of the taximeter. In addition the control shaft 17 fixedly carries a disc 19 formed at its periphery with several semi-circular notches 20 (FIGS. 2 and 3) which in succession are adapted to receive a roller 22 turnably carried by a pin which is fixed to a lever 21 supported for turning movement by a stationary pin 23 and urged by a spring 24 in a clockwise direction, as viewed in FIGS. 2 and 3, so that in this way the control shaft 17 is releasably retained in a given angular position providing a given function of the taximeter. The blocking disc 12 is carried by the shaft 17 but is freely turnable with respect thereto. The disc 12 is formed at its periphery with a pair of substantially rectangular notches 25 and 26 which are diametrically opposed to each other, and these notches cooperate with a projection 27 of a blocking lever 28 which together with the disc 12 forms a releasable blocking means as described below. The blocking lever 28 is turnably supported by a stationary pin 29 and is urged by a spring 30 in a clockwise direction, as viewed in FIGS. 2 and 3, so that the projection 27 of the blocking lever 28 is urged toward the periphery of the blocking disc 12. When the projection 27 is in one of the notches 25 or 26 the releasable blocking means 12, 28 is in a blocking position while when the lever 28 is displaced in opposition to the spring 30 in a counterclockwise direction, as viewed in FIGS. 2 and 3, so as to move the projection 27 out of one of the notches 25 and 26, the lever 28 is in an unblocking position, and this lever is shown in its unblocking position in FIG. 3 as well as in the dotted line position of FIG. 2. An electrical switch 30' is located in the path of turning of the lever 28 so as to be closed thereby when the lever 28 turns from its blocking to its unblocking position, and as is apparent from FIG. 4 the switch 30' is located in the electrical circuit of the motor 2, so that the turning of the blocking lever 28 from its blocking to its unblocking position closes the switch 30' and energizes the motor 2, while the return of the lever 28 to its blocking position opens the switch 30' and stops the motor 2.

The gear 9 of the differential drive 8, which includes the releasable blocking means 12, 28, is in mesh with an intermediate gear 31 supported for rotation about its axis by a stationary shaft and in turn meshing with a gear 34. This gear 34 is fixedly carried by the elongated core 32 (FIG. 6) of the spring motor 33. As is apparent from FIG. 6, the spring motor 33 includes in addition to the core 32, the barrel housing 35 and the spiral spring 35' coiled around the core 32 and, of course, fixed at its outer end to the side wall of the barrel housing 35 and at its inner end to the core 32, as is well known in the art. The barrel housing 35 is of course freely turnable with respect to the core 32 which it coaxially surrounds. The barrel housing 35 is fixed integrally with a gear 36 which meshes with a gear 37 fixedly carried by an elongated shaft 38 so that through the gear 37 the drive from the barrel housing 35 is transmitted to a gear 39 which is also fixedly carried by the shaft 38, and this gear 39 drives the clockwork 40 which is of a conventional construction well known in the art, the gear 39 in addition to transmitting its drive to the clockwork 40 also transmitting its drive to the shaft 41 which actuates the totalizing mechanism, in the manner well known in the art, in order to indicate to the occupant of the taxi the price at any given moment during the trip.

Operatively connected to the shaft 41 are a pair of overrunning clutches 42 and 43 which serve as one-way drives and which transmit to the shaft 41, and thus to the totalizing mechanism, a drive according, on the one hand, to the time which has expired and in accordance with the particular rate charged for this time, and on the other hand in accordance with the distance traveled. The structure for measuring the fare according to the distance traveled is not shown and is well known in the art while the structure for advancing the totalizing elements in accordance with the rotation of the shaft 41 also is not shown. A spring-actuated lever also cooperates with the shaft 41 in a manner known in the art.

A core lever 45 is fixed to and extends radially from the core 32, this lever 45 turning together with the core 32 and the gear 34 which is fixed thereto. Actually the lever 45 may be fixed to and extend from the hub 32' of the gear 34. This lever 45 carries at its outer free end a projection 44 in the form of an elongated pin extending parallel to the core 32. The barrel housing 35 turnably carries a housing lever 47 which, while turning with the barrel housing 35 around the axis of the core 32, is also turnable with respect to the barrel housing 35, and for the purpose of turnably supporting the lever 47 the barrel housing 35 fixedly carries a pivot pin 46 on which the lever 47 is turnably mounted. A spring means 48 is operatively connected to the lever 47 for urging the latter in a clockwise direction, as viewed in FIGS. 6–8, as well as in FIGS. 2 and 3, and thus it will be seen that the spring means 48 urges one end 47' of the lever 47 toward the core 32 and the opposite end 47" of the lever 47 away from the core 32. In the embodiment of FIGS. 7 and 8, the lever 47, instead of being provided with an end 47" as shown in FIGS. 2, 3 and 6, is provided with a hook-shaped portion 47''', for a purpose referred to below. In the embodiment of FIGS. 2, 3 and 6 a limiting means which limits the turning of the end portion 47" of the lever 47 toward the core takes the form of a pin 49 which is fixedly carried by the barrel housing and which is located in the path of turning of the end 47" of lever 47 toward the core 32, while in the embodiment of FIGS. 7 and 8 it is the hook-shaped end portion 47''' of the lever 47 which forms the limiting means limiting the movement of the end 47''' toward the core. Thus, the embodiment of FIGS. 7 and 8 does not require a stop member 49.

The above-described structure operates in the following manner:

Before the spring motor assembly is assembled together with the remainder of the taximeter, the parts 32, 32', 35, 35', 34 and 45 are assembled together to form a complete unit. With the parts thus assembled the spring 35' is given a predetermined pretension adapted to the particular taximeter, this pretension being on the order, for example, of five turns. In order to maintain this pretension in the spring motor the housing lever 47 is provided with its end portion 47" or with its hooked portion 47''', as shown in FIGS. 7 and 8, this end portion of the lever 47 cooperating with the projection 44 of the core lever 45 so as to prevent running down of the spring motor beyond the point where it has this predetermined pretension which is set into the spring motor before it is assembled with the rest of the structure. During running down of the spring motor its housing 35 turns in a clockwise direction with respect to the core 32, as viewed in FIG. 6, as well as in FIGS. 7 and 8, and it is apparent from FIGS. 6 and 7 that when the parts have the position illustrated in FIGS. 6 and 7 the barrel housing 35 cannot turn in a clockwise direction relative to the pin 44 which is carried by the core lever 45, so that the barrel housing cannot run down beyond the position shown in FIGS. 6 and 7.

When the completed spring motor assembly is assembled with the rest of the structure the housing lever 47 has the position shown in FIGS. 6 and 7. The barrel housing is assembled with the rest of the structure in an angular position where the lever 45 extends substantially horizontally to the right, as indicated in FIG. 2. When the taximeter has been assembled in this manner, the operator will turn the blocking lever 28 by hand only once from its blocking to its unblocking position so as to release the blocking disc 12 and energize the motor 2 as described above. The projection 27 of the lever 28 will thus release the disc 12, and after this disc has turned through a small angle the projection 27 will simply rest against the outer periphery of the disc 12 after release of the lever 28. The transmission which is connected to the motor 2 and which includes the differential drive 8 will drive the disc 12 through the differential drive 8. At this time the sun gear 15 as well as the disc 19 and the shaft 17 remain stationary because of the action of the lever 21 on the disc 19, so that the planetary gearing 13, 14 turns with respect to the stationary gear 15, and the gear 9 will be driven through this transmission by the sun gear 7 in a direction opposite to the direction of rotation of the sun gear 7. Because of the connection of the gear 9 to the disc 12 through the pins 10 and 11, as described above, the disc 12 turns together with the gear 9, and this disc 12 turns until the next notch 25 or 26 reaches the projection 27 of the lever 28 whereupon this lever 28 is returned by the spring 32 to its blocking position and the switch 30' opens so as to terminate the operation of the motor 2. The turning of the gear 9 is transmitted through the gear 31 to the core 32, through the gear 34 which is fixed thereto, and the transmission ratio is such that by the time the next notch 25 or 26 has reached the projection 27 the core 32 as well as the lever 45 will have been turned from their starting position in a clockwise direction through a single revolution. It will be noted from FIGS. 2 and 6 that the clockwise turning of the core 32 and the lever 45 therewith causes the pin or projection 44 of the lever 45 to turn away from the housing lever 47 so that the spring 48 places this lever in the position indicated in FIG. 3, and this is the position that the lever 47 is in when the single revolution of the core 32 has been completed. Thus, at this time the end 47' of the lever 47 is located relatively close to the axis of the core 32 in engagement therewith, as indicated in FIG. 3, and this position is also indicated in FIG. 8. In this way the spring motor has been wound through one additional turn.

Inasmuch as the clockwork 40 as well as the shaft 41 are driven from the spring motor 33, by rotation of the barrel housing 35 thereof, this barrel housing has a relatively small speed of turning. During the running down of the spring motor the barrel housing 35 turns together with the housing lever 47 also in a clockwise direction, and of course the pin 49 turns together with the barrel housing in the embodiment of FIGS. 2, 3 and 6, and this turning takes place slowly in a clockwise direction, as viewed in FIGS. 2, 3 and 6, so that the parts again approach the position indicated in FIGS. 6 and 7. Thus, as the barrel housing turns in a clockwise direction with respect to the core 32 and approaches the position shown in FIGS. 2 and 6 the lever 47 will move past the lever 45 and the pin 44 of the lever 45 will engage the lever 47 to cause the latter to turn in opposition to the spring 48 in a direction which will displace the end 47' of the lever 47 away from the core 32. The displacing of the end 47' of the lever 47 in this way away from the core 32 during the running down of the spring motor 33 locates the end 47' of the lever 47 in a path of turning in which the upper free end of the blocking lever 28 is located, as is apparent from FIG. 2. It will be noted that the lever 47 is shown in FIG. 2 is a position it takes prior to reaching the final limiting position indicated in FIG. 6. In the position of FIG. 2 the barrel housing can continue to turn during the running down of the spring motor, and as a result the end 47' of the lever 47 engages and turns the lever 28 from its blocking to its unblocking position. This will result again in closing of the switch 30' so that the motor 2 will again become energized and the spring motor will again become tensioned by one turn in the manner described above. The lever 45 turns together with the projection 44 in a clockwise direction with the projection 44 moving away from the lever 47, the rate of turning of the core 32 at this time being substantially greater than the rate of turning of the barrel housing 35 during running down of the spring motor. In fact, the end 47' of the lever 47 still engages the free end of the blocking lever 28 when the pin or projection 44 of the core lever 45 reaches the lever 47, and it is this same projection 44 which engages the lever 47 and turns its end 47' beyond and away from the lever 47 so that the spring 48 can now move the end 47' of the lever 47 toward the core until the lever 47 again has the position indicated in FIG. 3. The parts will then continue to operate in the manner described above until the next notch of the blocking disc 12 reaches the projection 27 of the blocking lever 28, and the parts will stop when the lever 45 has again reached the position indicated in FIG. 2, and of course the running down of the spring motor 33 may take place continuously during this time or it may have terminated depending upon the operation of the taximeter.

It should be noted that during the time that the end 47' of the lever 47 acts on the free end of the blocking lever 28, this lever 28 tends to continue the turning of the lever 47 in opposition to the spring 48, but the pin 49 limits this turning in the embodiment of FIGS. 2, 3 and 6 while such turning of the lever 47 is limited by the hook-shaped end portion 47''' thereof in cooperation with the pin 44 in the embodiment of FIGS. 7 and 8.

Figure 5:
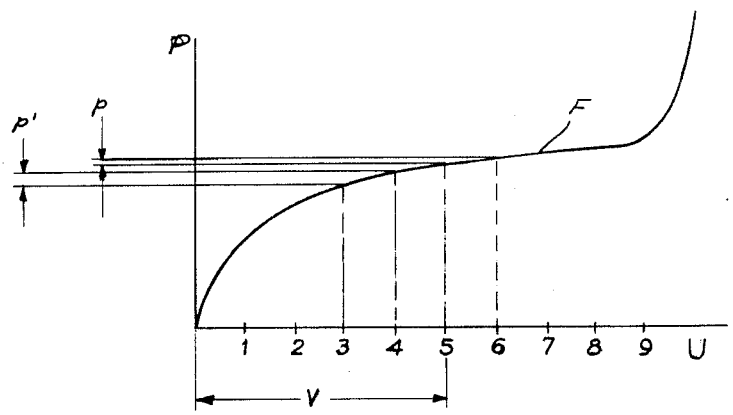
FIG. 5 illustrates graphically the manner in which the tension of the spring motor is maintained substantially constant.

Thus, it is apparent that with the structure of the invention the spring motor is periodically tensioned in such a way that the tensioning thereof is only to the extent of one turn of the spring while a predetermined pretension of the spring, adapted to the particular taximeter, is maintained, so that in this way the spring motor drives the clockwork at all times with a substantially constant turning moment. Referring to FIG. 5, it will be seen that the power P of the spring is plotted against the number of turns thereof, the number of turns being indicated at the abscissa of the graph of FIG. 5, and the pretension V of five turns is indicated in FIG. 5. The curve F is the characteristic curve of the particular spring, and it is apparent that when the spring tension is maintained, as described above, between 5 and 6 turns, the power will range only through the extent $p$ indicated in FIG. 5. If a lesser pretension were provided such as, for example, three turns and the tensioning varied between three and four turns, then the power provided by the spring would at all times be maintained in the range $p'$ indicated in FIG. 5. Thus, it is apparent that with the structure of the invention it is indeed possible to maintain the turning moment with which the spring motor drives the clockwork substantially constant at all times.

In order to turn the control shaft 17 which controls the functioning of the taximeter the motor 2 is energized through an unillustrated hand-operated switch. Inasmuch as the blocking disc 12 cannot turn except during the tensioning of the spring motor 33, the motor 2 if energized by hand will drive the sun gear 15 of the shaft 17 inasmuch as the sun gear 7 and planetary gears 14 turn with shaft 5. The de-energizing of the motor 2 takes place automatically when the shaft 17 reaches its next position, as the results of a known automatic control, and thus the single electric motor 2 may be used with the structure of the invention through the illustrated transmission means which includes the differential drive 8 for driving both the control shaft 17 as well as the structure which tensions the spring motor 33. It should be noted that a brake assembly cooperates with the motor 2 for bringing the latter substantially instantaneously to a stop as soon as its circuit is opened.

It will be understood that each of the elements described above, or two or more together, may also find a useful application in other types of taximeters differing from the types described above.

While the invention has been illustrated and described as embodied in clockwork drives for taximeters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a taximeter, in combination, a clockwork; a spring motor operatively connected to said clockwork for driving the same; a control shaft; an electric motor; transmission means including a control means having a first position connecting said electric motor to said control shaft for operating the same and having a second position connecting said electric motor to said spring motor for periodically tensioning the same, said transmission means including a differential drive transmitting the drive from said electric motor on the one hand to said control shaft and on the other hand to said spring motor; and means controlled by said spring motor for automatically shifting said transmission means to said second position when said spring motor has run down to a selected extent and to said first position when said spring motor has been wound up to a selected extent whereby a substantially constant spring torque drives said clockwork irrespective of the drive of said control shaft by said electric motor.

2. In a taximeter, in combination, a clockwork; a spring motor operatively connected to said clockwork for driving the same; a control shaft; an electric motor; transmission means connecting said electric motor to said control shaft for operating the same and also connecting said electric motor to said spring motor for periodically tensioning the same, said transmission means including a differential drive transmitting the drive from said electric motor on the one hand to said control shaft and on the other hand to said spring motor, said differential drive including a releasable blocking means having engaged and disengaged positions, said releasable blocking means when in its engaged position preventing said differential drive from transmitting a drive from said electric motor to said spring motor and said releasable blocking means when in its disengaged position permitting said differential drive to transmit a drive from said electric motor to said spring motor; and means controlled by said spring motor for automatically shifting said blocking means to said disengaged position when said spring motor has run down to a selected extent and to said engaged position when said spring motor has been wound up to a selected extent whereby a substantially constant spring torque drives said clockwork irrespective of the drive of said control shaft by said electric motor.

3. In a taximeter, in combination, a clockwork; a spring motor operatively connected to said clockwork for driving the same; a control shaft; an electrical motor; transmission means connecting said electric motor to said control shaft for operating the same and also connecting said electric motor to said spring motor for periodically tensioning the same, said transmission means including a differential drive transmitting the drive from said electric motor on the one hand to said control shaft and on the other hand to said spring motor, said differential drive including a releasable blocking means having engaged and disengaged positions, said releasable blocking means when in its engaged position preventing said differential drive from transmitting a drive from said electric motor to said spring motor and said releasable blocking means when in its disengaged position permitting said differential drive to transmit a drive from said electric motor to said spring motor, said releasable blocking means including a rotary disc formed with a cutout in its periphery and a blocking lever having a projection located in said cutout when said blocking means is in its engaged position and displaced from said cutout when said blocking means is in its disengaged position; and means controlled by said spring motor for automatically shifting said blocking means to said disengaged position when said spring motor has run down to a selected extent and to said engaged position when said spring motor has been wound up to a selected extent whereby a substantially constant spring torque drives said clockwork irrespective of the drive of said control shaft by said electric motor.

4. For use in a taximeter, in combination, a spring motor for driving a clockwork of the taximeter, said spring motor including an elongated rotary core, a barrel housing coaxially surrounding and freely turnable with respect to said core, and a spring in said housing coiled around said core and having its ends respectively fixed to said housing and core; a core lever fixed to said core for rotation therewith; a housing lever turnably carried by said barrel housing for turning movement with respect thereto, said housing lever also turning with said barrel housing around the axis of said core during running down of the spring motor; spring means operatively connected to said housing lever for urging one end thereof toward and an opposite end thereof away from said core; a projection carried by said core lever and located in the path of movement of said opposite end of said housing lever during turning of the latter with said barrel housing while said spring motor runs down, the engagement of said opposite end of said housing lever with said projection during running down of the spring motor turning said housing lever in a direction displacing said one end thereof in opposition to said spring means away from said core; drive means operatively connected to said core for turning the same to tension said spring motor; and releasable blocking means having engaged and disengaged positions and operatively connected to said drive means for preventing the latter from driving said core when said blocking means is in said engaged position and for releasing said drive means to drive said core when said blocking means is in said disengaged position thereof, said blocking means including a blocking lever turnable between a blocking position placing said blocking means in said engaged position thereof and an unblocking position placing said blocking means in said disengaged position thereof, and said blocking lever having a free end portion located in the path of movement of said one end of said housing lever when the latter has been displaced by said projection of said core lever so that said housing lever will engage said blocking lever and said barrel housing turning together with said housing lever during running down of the spring motor in a direction which displaces said blocking lever from said blocking to said unblocking position thereof when said blocking lever is engaged by said housing lever, whereby said drive means is then automatically released by said blocking means to drive said core and automatically tension said spring motor.

5. The combination of claim 4 and wherein said drive means includes an electric motor and a transmission between said electric motor and said core, the circuit of said electric motor including a switch which when closed energizes said electric motor and said switch being located in the path of movement of said blocking lever from said blocking to said unblocking position thereof to be closed by said blocking lever when the latter moves to said unblocking position thereof.

6. The combination of claim 4 and wherein a limiting means cooperates with said housing lever for limiting the turning thereof in opposition to said spring means.

7. The combination of claim 6 and wherein said limiting means includes a stop member carried by said barrel housing and located in the path of turning of said housing lever when said one end thereof is displaced away from said core by said projection of said core lever.

8. The combination of claim 6 and wherein said limiting means includes a hook at said opposite end of said housing lever engaging said projection of said core lever.

9. An apparatus comprising, in combination, a clockwork; a spring motor operatively connected to said clockwork for driving the same; a shaft for performing a function unrelated to said clockwork; an electric motor; transmission means shiftable between a first position connecting said electric motor to said spring motor and a second position connecting said electric motor to said shaft; and shifting means controlled by said spring motor and connected to said transmission means for automatically shifting said transmission means to said first position when said spring motor has run down to a selected extent and to said second position when said spring motor has been wound up to a selected extent whereby a substantially constant spring torque drives said clockwork irrespective of the drive of said shaft by said electric motor.

10. An apparatus comprising, in combination, a clockwork; a spring motor operatively connected to said clockwork for driving the same, said spring motor having a selected tensioned first condition and including means limiting running down of said spring motor to a slightly less tensioned second condition so that the driving torque of said spring motor is substantially constant while said spring motor runs down from said first condition to said condition; a shaft for performing a function unrelated to said clockwork; an electric motor; transmission means shiftable between a first position connecting said electric motor to said spring motor and a second position connecting said electric motor to said shaft; and shifting means controlled by said spring motor and connected to said transmission means for automatically shifting said transmission means to said first position when said spring motor has run down to said second condition and to said second position when said spring motor has been wound up to said first condition whereby a substantianally constant spring torque drives said clockwork irrespective of the drive of said shaft by said electric motor.

11. In a taximeter, in combination, a clockwork for driving the totalizer of the taximeter; a spring motor operatively connected to said clockwork for driving the same; a control shaft having a plurality of control positions for setting the taximeter to different operational conditions; an electric motor; transmission means shiftable between a first position connecting said electric motor to said spring motor and a second position connecting said electric motor to said shaft so that the same is shifted between said control positions; and shifting means controlled by said spring motor and connected to said transmission means for automatically shifting said transmission means to said first position when said spring motor has run down to a selected extent and to said second position when said spring motor has been wound up to a selected extent whereby a substantially constant spring torque drives said clockwork irrespective of the turning of said control shaft by said electric motor between said control positions.

12. In a taximeter, in combination, a clockwork for driving the totalizer of the taximeter; a spring motor operatively connected to said clockwork for driving the same, said spring motor having a selected tensioned first condition and including means limiting running down of said spring motor to a slightly less tensioned second condition so that the driving torque of said spring motor is substantianally constant while said spring motor runs down from said first condition to said second condition; a control shaft having a plurality of control positions for setting the taximeter to different operational conditions; an electric motor; transmission means shiftable between a first position connecting said electric motor to said spring motor and a second position connecting said electric motor to said shaft so that the same is shifted between said control positions; and shifting means controlled by said spring motor and connected to said transmission means for automatically shifting said transmission means to said first position when said spring motor has run down to said second condition and to said second position when said spring motor has been wound up to said first condition whereby a substantially constant spring torque drives said clockwork irrespective of the turning of said control shaft by said electric motor between said control positions.

13. In a taximeter, in combination, a clockwork for driving the totalizer of the taximeter; a spring motor operatively connected to said clockwork for driving the same, said spring motor having a selected tensioned first condition and including means limiting running down of said spring motor to a slightly less tensioned second condition so that the driving torque of said spring motor is substantially constant while said spring motor runs down from said first condition to said second condition; a control shaft having a plurality of control positions for setting the taximeter to different operational conditions; an electric motor; transmission means shiftable between a first position connecting said electric motor to said spring motor and a second position connecting said electric motor to said shaft so that the same is shifted between said control positions; shifting means controlled by said spring motor and connected to said transmission means for automatically shifting said transmission means to said first position when said spring motor has run down to said second condition and to said second position when said spring motor has been wound up to said first condition whereby a substantially constant spring torque drives said clockwork irrespective of the turning of said control shaft by said electric motor between said control positions; and a switch connected in the circuit of said electric motor and being controlled by said shifting means to start said electric motor when said transmission means is in said first position and to stop said electric motor when said transmission means is in said second position, said electric motor being adapted to be manually started for turning said control shaft between said control positions.

14. A spring motor winding arrangement comprising, in combination, a spring motor for driving a clockwork of the taximeter and including a first member, a second member, and a spring connecting said first and second members; a first lever fixed to said first member for rotation therewith; a second lever mounted on said second member for turning movement, and being also turnable with said second member relative to said first member during the running down of the spring motor; spring means for biasing said second lever; a projection carried by said first lever located in the path of movement of said second lever during turning of the latter with said second member while said spring motor runs down so that upon engagement of said second lever with said projection said second lever is turned against the action of said spring means; drive means for turning said first member to tension said spring motor; and releasable blocking means having engaged and disengaged positions and connected to said drive means for preventing the latter from driving said first member in said engaged position of said blocking means, and for releasing said drive means to drive said first member in said disengaged position of said blocking means, said blocking means including a portion located in the path of movement of said second lever when the same is displaced by said projection so that said second lever will engage said blocking means during running down of the spring motor to shift said blocking means to said disengaged position whereby said drive means is automatically released by said blocking means to drive said first member to automatically tension the spring motor.

15. A spring motor winding arrangement as set forth in claim 14 wherein during the running down of the spring motor said second member turns one revolution under the action of said spring before said drive means is released by said blocking means, and including means operated by said blocking means for disconnecting said drive means after the same has turned said first member one revolution.

References Cited by the Examiner
UNITED STATES PATENTS

| | | | |
|---|---|---|---|
| 1,310,702 | 7/19 | Jaeger | 58—147 |
| 1,920,479 | 8/33 | Poole | 58—26 |
| 2,637,492 | 5/53 | Winch | 235—30 |
| 2,797,545 | 7/57 | Itaru Osawa | 58—41 |
| 3,000,468 | 9/61 | Morganson | 58—40 X |
| 3,012,712 | 12/61 | Haupt | 235—30 |

LEO SMILOW, *Primary Examiner.*